United States Patent
Mandyam

(10) Patent No.: US 8,255,716 B2
(45) Date of Patent: Aug. 28, 2012

(54) POWER OPTIMIZATION FOR DATA SERVICES

(75) Inventor: Giridhar D. Mandyam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 442 days.

(21) Appl. No.: 12/549,343

(22) Filed: Aug. 27, 2009

(65) Prior Publication Data

US 2011/0055613 A1    Mar. 3, 2011

(51) Int. Cl.
*G06F 1/26* (2006.01)
(52) U.S. Cl. ......... 713/320; 455/574; 370/311; 370/318
(58) Field of Classification Search .......... 713/300–340; 455/572, 574; 370/311, 318
See application file for complete search history.

(56) References Cited

U.S. PATENT DOCUMENTS

| | | | | |
|---|---|---|---|---|
| 5,996,083 A * | 11/1999 | Gupta et al. | | 713/322 |
| 6,072,784 A * | 6/2000 | Agrawal et al. | | 370/311 |
| 6,108,316 A * | 8/2000 | Agrawal et al. | | 370/311 |
| 6,907,278 B2 * | 6/2005 | Herle | | 455/572 |
| 6,938,174 B2 * | 8/2005 | LeKuch et al. | | 713/320 |
| 7,499,878 B2 * | 3/2009 | Janakiraman et al. | | 705/14.73 |
| 7,647,515 B2 * | 1/2010 | Verdun | | 713/320 |
| 7,814,490 B2 * | 10/2010 | Capek et al. | | 718/103 |
| 7,889,688 B2 * | 2/2011 | Kitahara et al. | | 370/311 |
| 7,911,991 B2 * | 3/2011 | Park et al. | | 370/318 |
| 8,036,718 B2 * | 10/2011 | Lencevicius et al. | | 455/574 |
| 2002/0071397 A1 | 6/2002 | Keshavachar | | |
| 2006/0062112 A1 * | 3/2006 | Wijnands et al. | | 369/47.5 |
| 2009/0077401 A1 * | 3/2009 | Tsai | | 713/320 |
| 2010/0332861 A1 * | 12/2010 | Allalouf et al. | | 713/300 |

FOREIGN PATENT DOCUMENTS

| | | |
|---|---|---|
| EP | 1575219 A1 | 9/2005 |
| EP | 1798998 A1 | 6/2007 |

OTHER PUBLICATIONS

Mandyam, Giridhar. Improving Battery Life for Wireless Web Services Through the Use of a Mobile Proxy. QUalcomm Inc. IEEE 21st International Symposium on Personal Indoor and Mobile Radio Communications. 2010.*
Rado et al. Battery Modeling for Energy-Aware System Design. IEEE. Dec. 2003.*
Flinn, Jason. Extending Mobile Computer Battery Life Through Energy-Aware Adaptation. Dec. 2001.*
Chiasserini et al. Improving Battery Performance by Using Traffic Shaping Techniques. IEEE Journal on Selected Areas in Communications. vol. 19. No. 7. Jul. 2001.*
"iPhone Delivers up to Eight Hours of Talk Time." Apple press release. http://www.apple.com/pr/library/2007/06/18iphone.html. Jun. 18, 2007.

(Continued)

*Primary Examiner* — Matthew D Spittle
(74) *Attorney, Agent, or Firm* — Fariba Yadegar-Bandari

(57) ABSTRACT

Systems and methods for optimizing the power of a battery in a mobile device are provided. The systems and methods include receiving a request from at least one of a plurality of applications running on the mobile device. The systems and methods further include determining user characteristics from interacting with at least one of the applications and determining a user dwell time threshold based upon the user's interactions with an application. The systems and methods further include buffering requests if the user dwell time is less than the user dwell threshold level.

29 Claims, 7 Drawing Sheets

OTHER PUBLICATIONS

"Things you Never Knew your Cellphone Could Do." http://urbanlegends.about.com/od/business/a/cellphone_tips.htm. Feb. 23, 2007.

Cox, G.W. et al., "The Effectiveness of Battery-Conserving Protocols in Wireless LANs", IEEE/Sarnoff Symposium on Advances in Wired and Wireless Communications, Apr. 26-27, 2004, pp. 137-139.

International Search Report and Written Opinion—PCT/US2010/045075, International Search Authority—European Patent Office—Dec. 10, 2010.

Chang H. et al., "Web Browsing in a Wireless Environment: Disconnected and Asynchronous Operation in ARTour Web Express", ACM International Conference on Mobile Computing and Networking (Mobicom), Sep. 1997, pp. 260-269.

Chen I. R. et al., "Algorithms for Supporting Disconnected Write Operations for Wireless Web Access in Mobile Client-Server Environments", IEEE Transactions on Mobile Computing, vol. 1, No. 1, Jan.-Mar. 2002, pp. 46-58.

Irene C. Y. Ma. et al., "Characteristics of WAP Traffic", Wireless Networks, vol. 10, Issue 1, Jan. 2004, pp. 71-81.

Nuggehalli P. et al., "Energy Efficient Transmission Scheduling for Delay Constrained Wireless Networks", IEEE Transactions on Wireless Communications, vol. 5, No. 3, Mar. 2006, pp. 531-539.

Robinson S. "Cellphone Energy Gap: Myth or Reality", Strategy Analytics report, Jan. 29, 2008.

Yeung M. K. H. et al., "Wireless Cache Invalidation Schemes with Link Adaptation and Downlink Traffic", IEEE Transactions on Mobile Computing, vol. 4, No. 1, Jan./Feb. 2005, pp. 68-83.

\* cited by examiner

POWER OPTIMIZATION FOR DATA SERVICES

BACKGROUND

The described aspects relate to power optimization, and more specifically to apparatus and methods relating to power optimization for wireless device services based on user behavior.

Power consumption and extending battery life has been a design consideration since the first mobile devices were introduced. Modern mobile devices support a wide array of services including voice, video and audio playback, and internet use. Thus, power consumption and battery life optimization is now being considered with respect to each of these services.

Generally optimizing battery life for a mobile device included efficient hardware design modifications for longer battery life. However, optimizing the hardware in a mobile device for data service is difficult since there are many different types of data services available.

Therefore, improved apparatus and methods without having to modify the hardware of the mobile device are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One aspect relates to a method for optimizing power of a battery in a mobile device. The method may include receiving, at a first time, a request from at least one of a plurality of applications on the mobile device. The method may also include determining if a battery charge level of a battery on the mobile device meets a power preservation threshold. Further, the method may include determining if a current dwell time of user interaction with at least one of the applications meets a dwell time threshold. The dwell time threshold is based on user interaction characteristics from interacting with at least one of the plurality of applications. Moreover, the method may include buffering the request for processing until a second time later than the first time. The second time corresponds to an end of the dwell time threshold for the current dwell time, if the battery charge level meets the power preservation threshold and if the current dwell time does not meet the minimum dwell time threshold.

Another aspect relates to at least one processor configured for optimizing power of a battery in a mobile device. The processor may include a first module for receiving, at a first time, a request from at least one of a plurality of applications on the mobile device. In addition, the processor may include a second module for determining if a battery charge level of a battery on the mobile device meets a power preservation threshold. The processor may also include a third module for determining if a current dwell time of user interaction with at least one of the applications meets a dwell time threshold. The dwell time threshold is based on user interaction characteristics from interacting with at least one of the plurality of applications. Further, the processor may include a fourth module for buffering the request for processing until a second time later than the first time. The second time corresponds to an end of the dwell time threshold for the current dwell time, if the battery charge level meets the power preservation threshold and if the current dwell time does not meet the minimum dwell time threshold.

Yet another aspect relates to a computer program product for optimizing power of a battery in a mobile device. The computer program product may include a computer-readable medium including at least one instruction operable to cause a computer to receive, at a first time, a request from at least one of a plurality of applications on the mobile device, and at least one instruction operable to cause the computer to determine if a battery charge level of a battery on the mobile device meets a power preservation threshold. The computer program product may also include at least one instruction operable to cause the computer to determine if a current dwell time of user interaction with at least one of the applications meets a dwell time threshold. The dwell time threshold is based on user interaction characteristics from interacting with at least one of the plurality of applications. Additionally, the computer program product may include at least one instruction operable to cause the computer to buffer the request for processing until a second time later than the first time. The second time corresponds to an end of the dwell time threshold for the current dwell time, if the battery charge level meets the power preservation threshold and if the current dwell time does not meet the minimum dwell time threshold.

Another aspect relates to a mobile device. The mobile device may include means for receiving, at a first time, a request from at least one of a plurality of applications on the mobile device. In addition, the mobile device may include means for determining if a battery charge level of a battery on the mobile device meets a power preservation threshold. The mobile device may also include means for determining if a current dwell time of user interaction with at least one of the applications meets a dwell time threshold. The dwell time threshold is based on user interaction characteristics from interacting with at least one of the plurality of applications. Moreover, the mobile device may include means for buffering the request for processing until a second time later than the first time. The second time corresponds to an end of the dwell time threshold for the current dwell time, if the battery charge level meets the power preservation threshold and if the current dwell time does not meet the minimum dwell time threshold.

Yet another aspect relates to a mobile device. The mobile device may include a plurality of applications and a battery having a battery charge level. At least one of the plurality of applications is configured to generate at a first time a request for processing. Further, the mobile device may include a memory having a power preservation threshold and a dwell time threshold. The dwell time threshold is based on user interaction characteristics from interacting with at least one of the plurality of applications. In addition, the mobile device may include a request manager having request processing logic. The request processing logic is configured to determine if the battery charge level of the battery meets the power preservation threshold, to determine if a current dwell time of user interaction with at least one of the applications meets the dwell time threshold, and to buffer the request for processing until a second time later than the first time. The second time corresponds to an end of the dwell time threshold for the current dwell time, if the battery charge level meets the power preservation threshold and if the current dwell time does not meet the minimum dwell time threshold.

To the accomplishment of the foregoing and related ends, the one or more aspects comprise the features hereinafter fully described and particularly pointed out in the claims. The following description and the annexed drawings set forth in detail certain illustrative features of the one or more aspects.

These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
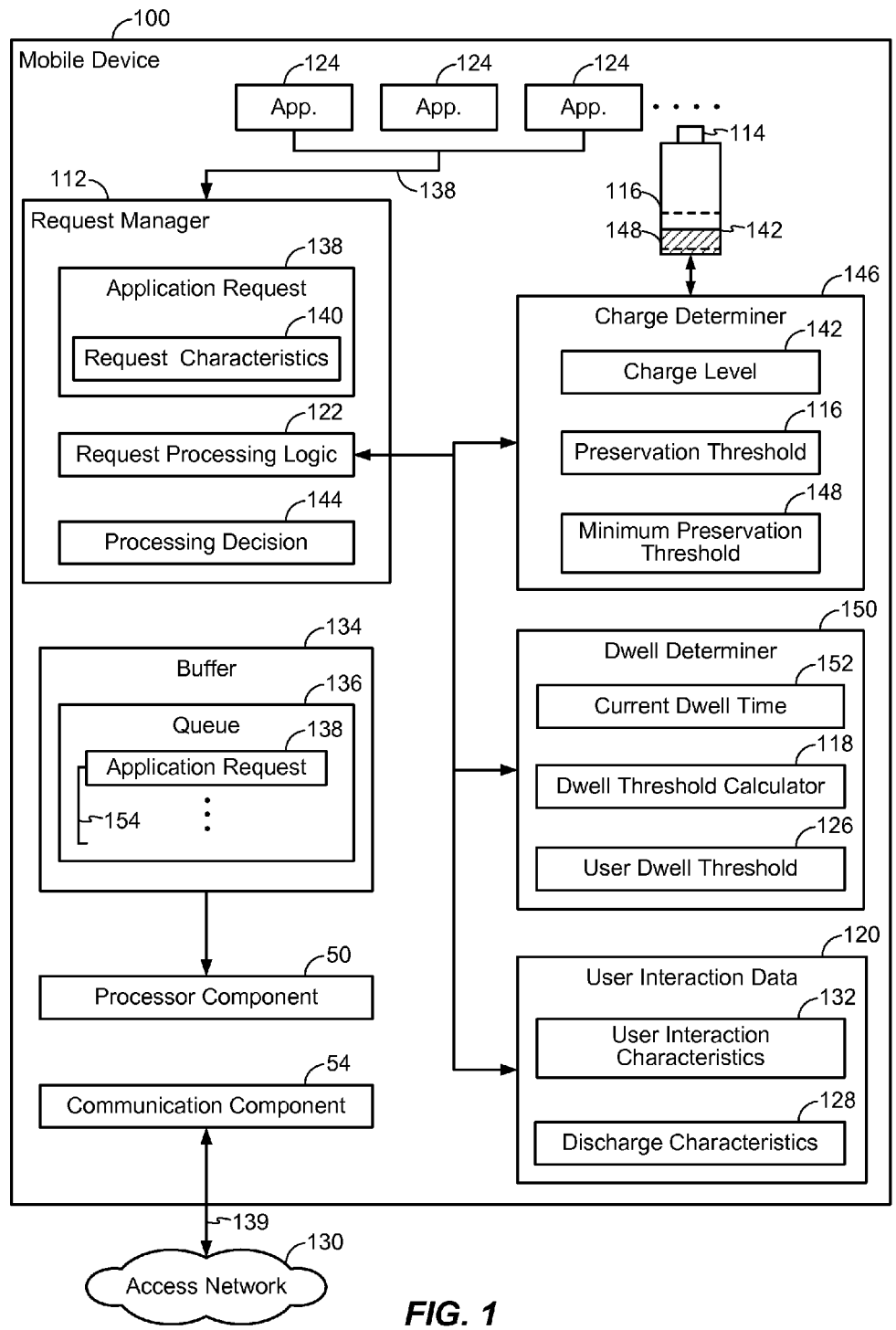
FIG. 1 is a schematic diagram illustrating a communication system using a request manager, in accordance with an aspect.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. The described aspects relate to systems and methods for optimizing the power of a battery in a mobile device by scheduling one or more received requests from at least one of a plurality of applications running on the mobile device prior to processing the request when the battery charge level of the mobile device reaches a power preservation threshold level where saving the remaining battery power is desired. The rate of discharge of the battery may be reduced for the period of time when the request buffered prior to processing.

In one aspect, scheduling the received request may include forming a queue of one or more of the requests in a buffer when a user dwell time for interacting with the requesting application is equal or above a user dwell threshold. For example, the user dwell threshold may be determined based upon an amount of time a user previously spent interacting with data retrieved for the application, or the user dwell threshold may be based upon a desired amount of time for a user to interact with the requesting application.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, in the subject description, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95, and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE, and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to the schematic diagram in FIG. 1, illustrated is a communication system 100 using a client-side proxy apparatus for optimizing power consumption, in accordance with an aspect. System 100 includes one or more mobile devices 100 communicating with one or more access networks 130. As discussed above, for example, mobile device 100 may be a cellular telephone, a satellite phone, a personal digital assistant (PDA), a handheld device having wireless connection capability, a computing device, among other processing devices connected to a wireless modem.

Mobile device 100 may include one or more applications 124 (e.g., Internet browsers, mobile widgets, etc.) running on mobile device 100 and operable to send a request 138, also referred to as an application request to a processor component 50 for processing. In one aspect, the processing may include, but is not limited to, initiating a communications component 54 to establish a connection and/or a communication 139 with an access network 130, and/or to send or receive a service or data via access network 130. Further, for example, application request 138 may include, but is not limited to, one or more of a request to: process data for the requesting application; establish a connection with a network or another computer device on the network; send data to or receive data from a network or computer device or location on a network, such as via a wired or wireless network connection; download a page or portion thereof from a website from access network 130; link to a webpage; perform a web service, such as one or more of a GET, POST or PUT; update data used by the requesting application, such as data relating to a weather report or stock quotes; or any request for obtaining data via access network 130, such as via a wireless connection, among other requests. Additionally, application request 138 may be a request that is automatically generated by the respective application 124, such as to retrieve an update based on a triggering event, or application request 138 may be initiated by or in response to a user input. Further, the one or more applications 124 may include, but are not limited to, one or more instructions or codes executable by processor component 50 for performing a task. Examples of a task include, but are not limited to, word processing, database management, e-mail sending or retrieval, Web browsing, or any other service that may be provided by a mobile device or via the mobile device from a network or another computer device on the network. For instance, such tasks may facilitate or be responsive to interaction with an end-user through a user interface, or such tasks may be performed in the "background" such that they are not noticeable to an end-user.

Mobile device 100 may also include request manager 112 interfaced with applications 124 and power supply 114, such as a battery. Request manager 112 may monitor the various application requests 138 that will use power, such as the battery capacity, from power supply 114 and, depending on the existence of certain conditions, may buffer one or more of the application requests 138 prior to routing the requests, for example, to access network 130. In the alternative, or additionally, for example, request manager 112 may be further interfaced with data relating to a user interaction data 120, or an amount of time a user spends interacting with one or more of the applications 124 generating the application requests 138 and/or interacting with the resulting retrieved data from access network 130, where request manager 112 may delay processing of application request 138 based on comparing a current user interaction time with such historical information.

Specifically, request manager 112 may further include request processing logic 122 operable for generating a processing decision 144 to schedule the various application requests 138 for immediate or delayed processing based on battery capacity and/or user interaction history. For example, rather than immediately processing application request 138, request manager 112 may schedule the application request 138 for future processing when battery 114 has an amount of charge 142 that reaches a certain power preservation threshold 116. In an aspect, the power preservation threshold 116 may be, for example, an amount of charge/power, or a percentage of the remaining charge/power, among other metrics, corresponding to a determined value where saving battery power is desired. For example, among other settings, power preservation threshold level 116 may be an offset from zero remaining charge, may be an offset from an amount of charge desired to be preserved to maintain basic functionality of the device, may be an offset based on the amount of charge capable of being recovered when the device is powered down, or may be some other value at which further reductions in capacity may be desired to be delayed. In one or more aspects, power preservation threshold 116 may be a value that is set by a manufacturer, by a network operator, or by a user of the device.

In some aspects, mobile device 100 may include a charge determiner 146 operable to obtain a value of current charge 142. For example, charge determine 146 may be hardware, software, etc., operable to measure battery 114 at any given time, or upon a periodic schedule, to determine and store the current value of charge 142. Charge determiner 146 may communicate with request manager 112 so that request processing logic 122 is operable to obtain the current value of charge 142 for use in making processing decision 144.

As noted above, in some aspects, besides considering a current charge level 142 relative to power preservation threshold 116, request manager 112 may alternatively, or in addition, make processing decision 144 based on user interaction history 120 and/or a current user interaction or dwell time 152. The dwell time may include an amount of time the user of the mobile device has interacted with a most recently retrieved data. For example, user interaction may include viewing a webpage, reading a webpage, or any other interactions, e.g., with a webpage, without generating a new request for transmission. For example, mobile device 100 may include a dwell determiner 150 configured to determine a current dwell time 152. Further, dwell determiner 150 may additionally store a user dwell threshold 126, which represents a historical or desired amount of time for user interaction with retrieved data. User dwell threshold 126 may be set and/or obtained from a manufacturer or network operator, or may be locally determined on mobile device 100, for example, through execution of a threshold calculator 118. In any case, in one or more aspects, user dwell threshold 126 may be obtained from a manufacturer or network operator based upon user interaction data 120, e.g., collected data of past user interactions with retrieved data, and determined as a function of the rate of discharge 128 of battery 114 and the user's characteristics 132 during previous interactions with access network 130. User characteristics 132 may include but are not limited to, for example, the user's web browsing habits, the amount of dwell time the user spends reading a website, and the type of content the user views (e.g., news, sports, weather, shopping, entertainment, maps, stock quotes, etc.) and the associated time the user spends viewing the particular type of content on the website, among other user characteristics. As such, based on user interaction data 120, user dwell threshold 126 may be a calculated value, such as but not limited to a mean, an average, etc., of the time a user spends viewing or interacting with retrieved data. In an aspect, dwell determiner 150 manages the collection of user interaction data 120. In another aspect, request manager 112 manages the collection of user interaction data 120.

In an aspect, request processing logic 122 may shape the traffic flow of the various requests 138 from applications 124 by forming a queue 136 of one or more application requests 138 in a buffer 134 based upon the battery charge 142 versus the power preservation threshold 116, and/or based on current user dwell time 152 versus user dwell threshold 126, and/or based on the required amount of time to recover the necessary battery charge 142, to fulfill the application request 138 (e.g., charge recovery). In an aspect, requests 138 in queue 136 may be ranked or ordered 154 by one or more request characteristics 140. Request characteristics 140 may include, but are not limited to, one or more of the priority of the request, e.g., where the priority may be based upon a corresponding priority associated with the respective requesting application 124, the amount of time the request may take to process, or the power consumption for the request based upon past histories, among other request characteristics. For example, queue 136 may be ranked by priority in descending order, e.g., with the application request having the highest priority at the top of the queue. In yet another aspect, queue 136 may be ranked by power consumption in descending order, e.g., the application request requiring the highest amount of battery power at the top of the queue. In another aspect, queue 136 may be primarily ranked in order of highest priority and secondarily ranked in order of the amount of battery power consumption. Therefore, the request manager 112 may be customizable for a particular user.

Figure 2:
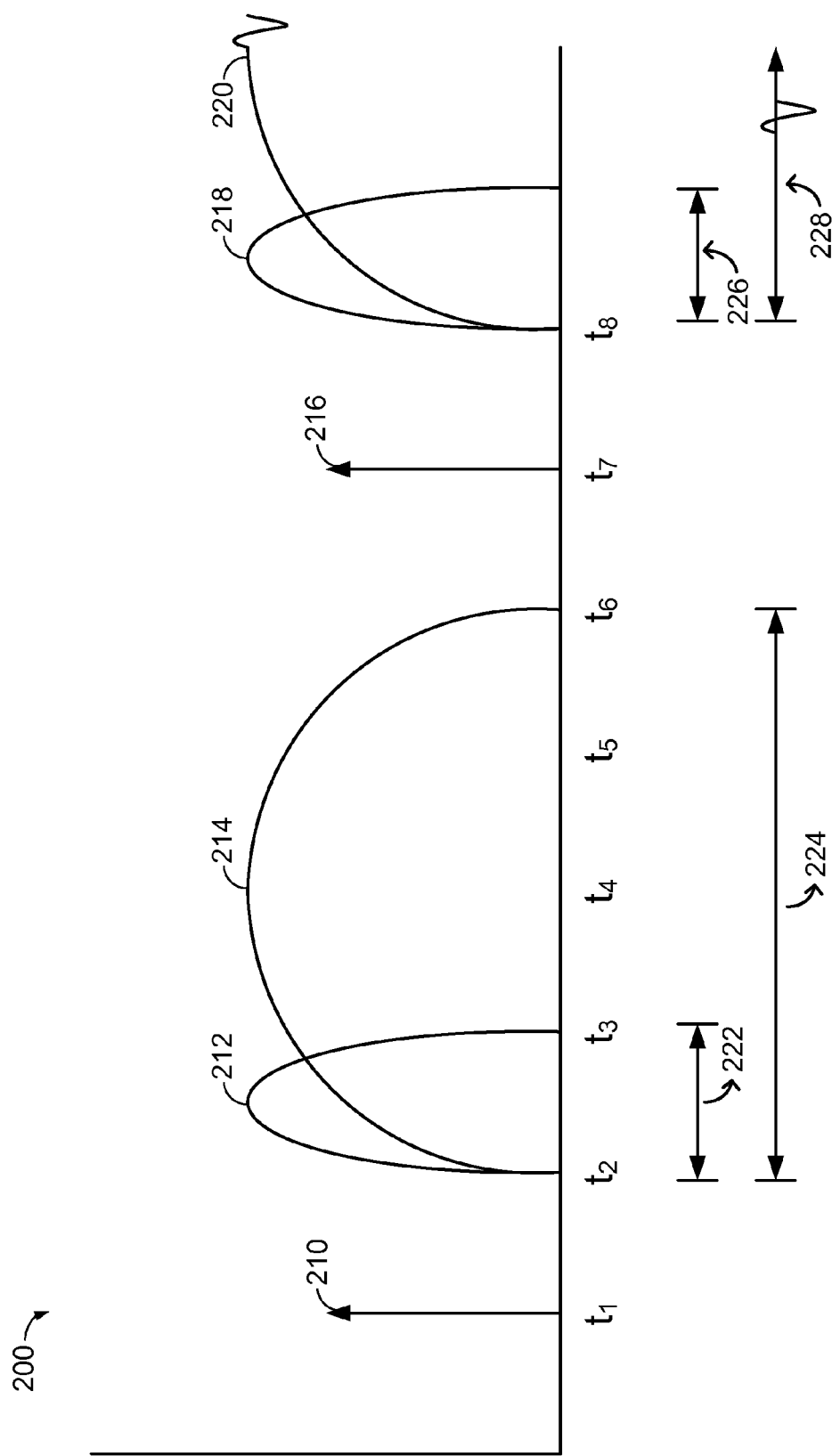
FIG. 2 is an illustration of an example graph illustrating the relationship between the request time for content from a webpage and the dwell time a user spends on the webpage, in accordance with another aspect.

Turning now to FIG. 2, illustrated is an example graph 200 illustrating the relationship between the request time for content from a webpage and the dwell time a user spends on the webpage, in accordance with one aspect. At time $t_1$, application 124 (FIG. 1) generates application request 138 for a transmission 210, e.g., requesting to download a webpage from access network 130 (FIG. 1). The packet inter-arrival 212 of the content associated with the requested transmission 210 is illustrated from time $t_2$ to $t_3$. The packet inter-arrival time 222 may include, for example, the time corresponding to retrieving the content for the webpage, and the load time of the requested webpage. User interaction 214 with the requested transmission 210 is illustrated from time $t_2$ to $t_6$. For example, the user dwell time 224 may include the interaction time the user spends interacting 214 with the requested transmission 210. For example, user interaction may include viewing a webpage, reading a webpage, or any other interactions, e.g., with a webpage, without generating a new request for transmission. In an aspect, the user dwell time 224 may be used for calculating the user dwell threshold level 126 (FIG. 1). For example, the user dwell threshold level 126 may be a calculated value, e.g., the mean dwell time 224 a user spends on a website. Next, at time $t_7$, the application 124 generates another application request 138 for another transmission 216. Then, at time $t_8$, the packet-interval arrival time 226 is started for transmission 216, as well as the user dwell time 228 for the user interaction 220 with the requested transmission 216.

The user dwell times 224 and 228 for the various application requests 138 associated with the transmission requests (e.g., 210, 216) may be stored as user history data 120 (FIG. 1). Thus, the threshold calculator 118 (FIG. 1) may use the user history data 120 in calculating the user dwell threshold level 126.

Figure 3:
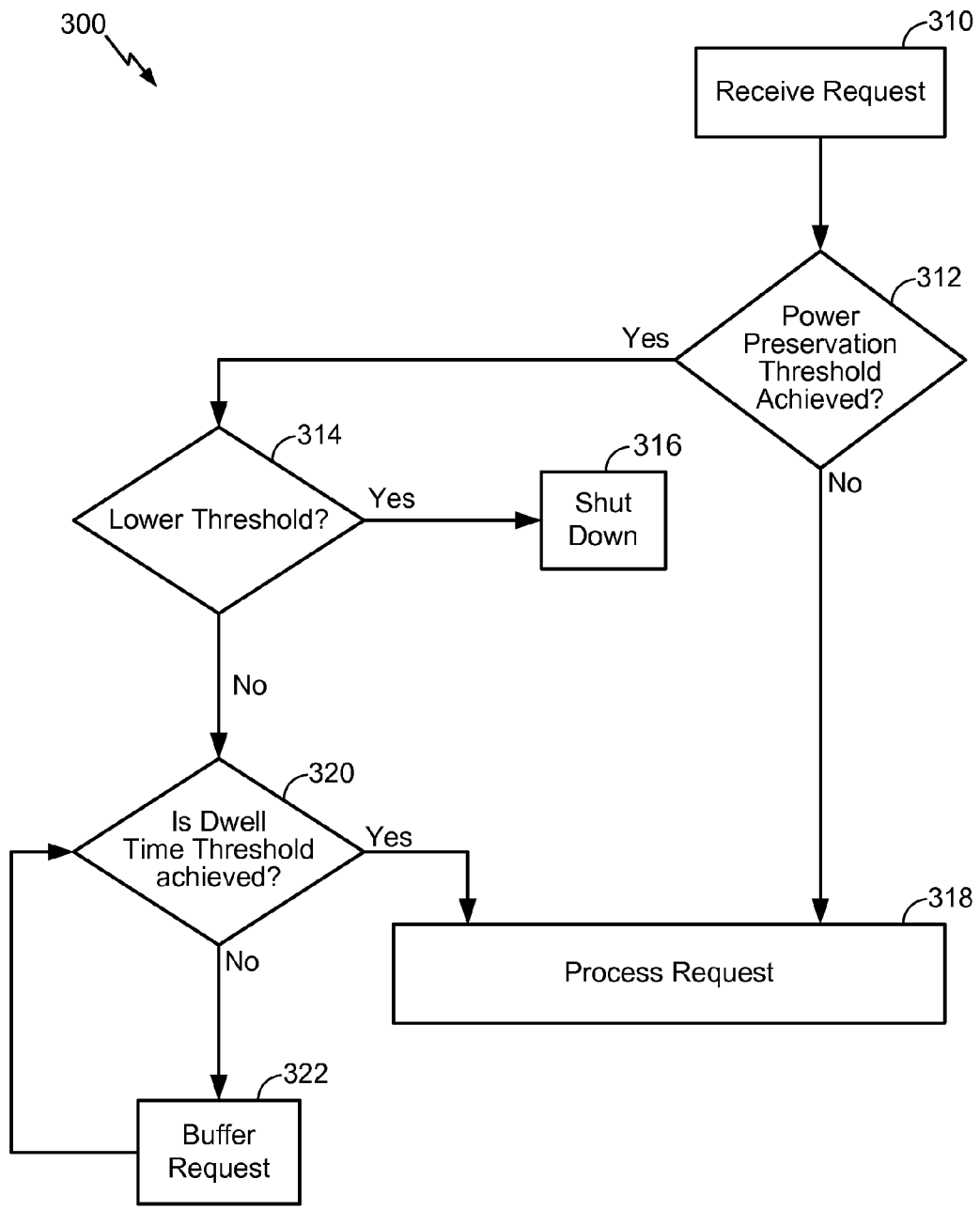
FIG. 3 is an illustration of an example flow chart illustrating power optimization based on user characteristics, in accordance with yet another aspect.

Referring now to the flow chart 300 illustrated in FIG. 3, in one aspect, power optimization for the mobile device is based upon past application requests and/or user interaction characteristics when interacting with retrieved data. In a first step 310, the request manager may receive one or more application requests from an application running on the mobile device for accessing a network, e.g., requesting to download a webpage from an access network. Next, in step 312, the request manager determines whether the battery level is below a power preservation threshold. The power preservation threshold may be predefined by a user, system operator, or the mobile device.

At 318, if the power preservation threshold is not achieved, e.g., the battery level is equal to or greater than the power preservation threshold, the request manager processes the received application request.

At 314, however, if the power preservation threshold is achieved, e.g., the current battery level is below the power preservation threshold, the request manager may determine whether the threshold represents a minimum threshold level 148 (FIG. 1). The minimum threshold level may include, for example, when the battery charge is not sufficient to power the mobile device or power an application request, or some other set minimum level that may be defined by a manufacturer, operator, or device user.

At 316, if a minimum threshold level is achieved by the battery charge level, the request manager may power down the mobile device. In yet another aspect, if a minimum threshold is achieved by the battery charge level, the mobile device may alert the user to power down the mobile device for a period of time in order to recover enough battery power, e.g., charge recovery, to perform the application request (e.g., viewing a website). In another aspect, if a minimum threshold is achieved by the battery charge level, the mobile device may preserve the state of the application prior to powering down (e.g., saving information).

At 320, if a minimum threshold level is not achieved by the battery charge level, the request manager may determine whether the dwell time threshold is achieved. As noted above, the dwell time threshold may be a calculated value, for example, based upon the amount of time a user spends viewing, reading or any other interactions with retrieved content such a webpage, etc., e.g., the user interaction characteristics. The user interaction characteristics may include, but are not limited to, for example, the user's web browsing habits, the amount of dwell time the user spends reading a website, and the type of content the user views (e.g., news, sports, weather, shopping, entertainment, maps, and stock quotes) and the associated time the user spends viewing the particular type of content on the website, among other user characteristics. In an aspect, the request manager may store the user's web browsing characteristics in a user history data repository and retrieve the data to determine the user's web browsing characteristics.

In an aspect, the user dwell threshold may be a calculated value that is a function of the user interaction history data 120, such as but not limited to a mean or average value of the user dwell time for interacting with retrieved content. Thus, the request manager may obtain or calculate quantifiable constraints for shaping the application requests.

At 318, if the user dwell threshold is achieved, e.g., if the user dwell time is equal to or above the user dwell threshold, then the request manager may process the request.

At 322, if the user dwell threshold is not achieved, e.g., if the user dwell time is below the user dwell threshold, then the request manager may buffer the application requests, thereby limiting the rate of the power consumption over time. For example, the request manager may wait a period of time, thereby spacing out the application requests prior to forwarding the application request for processing. In an aspect, the request manager may wait until the user dwell time equals the user dwell threshold prior to forwarding the application request. For example, if a user's dwell threshold is 45 seconds and the user spends 40 seconds reading a webpage, the request manager may buffer the next request for 5 seconds prior to forwarding the request. Therefore, the rate of discharge of the battery may be reduced for the period of time the request manager buffers the request prior to forwarding. However, from the user's perspective, the user will appear to still be interacting with the services, e.g., the content retrieved via the prior application request, even though the application requests are being held in the buffer by the request manager.

Figure 4:
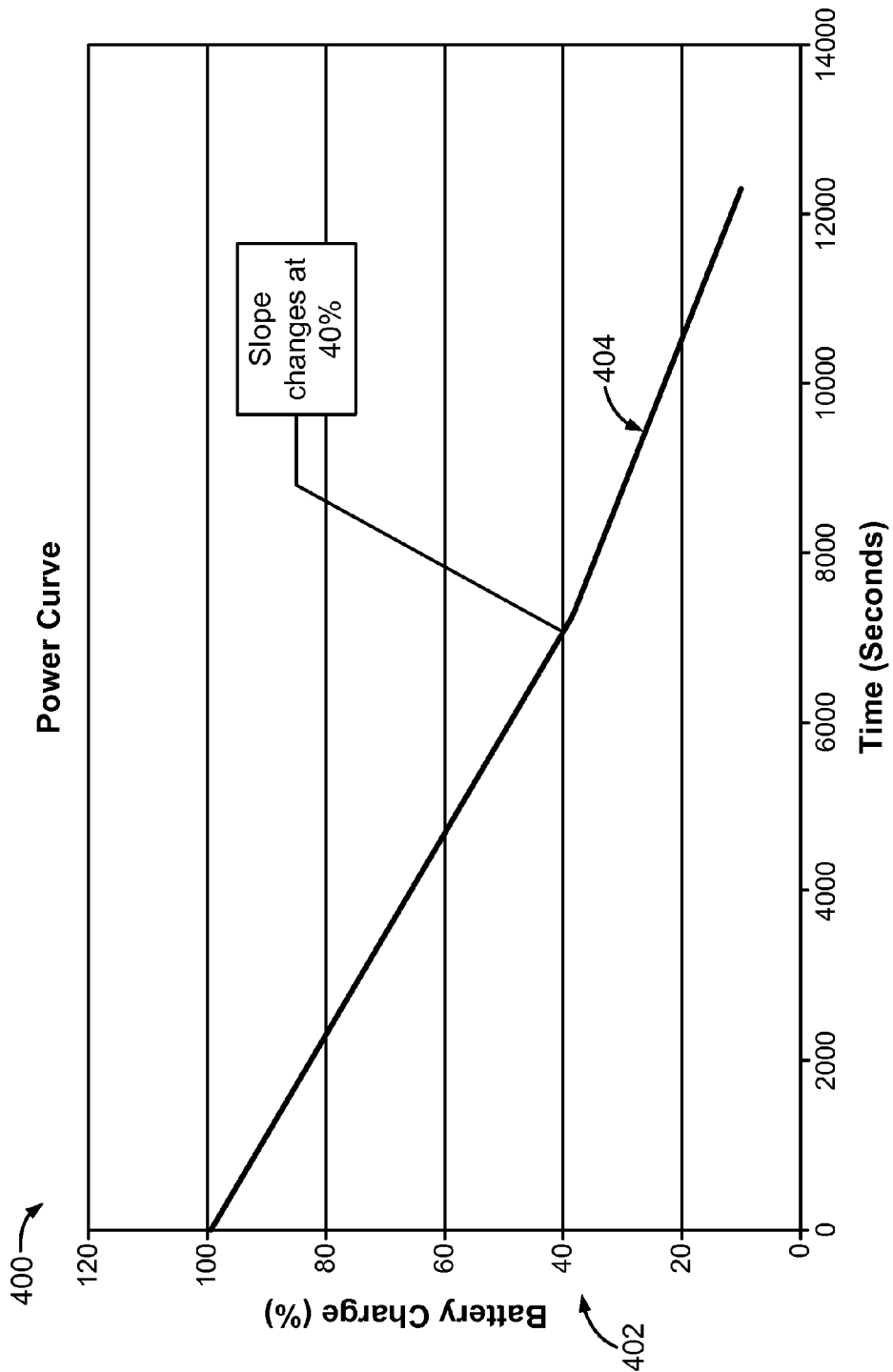
FIG. 4 is an illustration of an example power curve, in accordance with another aspect.

Turning now to an example graph 400 in FIG. 4, illustrating a power curve in accordance with an aspect of the apparatus and methods of power optimization described herein. Graph 400 compares the rate of discharge of a battery from 100% to 0% on the y-axis to the time it takes to discharge the battery in seconds on the x-axis. In the example illustrated in graph 400, the power preservation threshold 402 is equal to 40%. Thus, when the battery charge level equals or is less than 40%, the method discussed above in relation to FIG. 3 is applied to the mobile device. Therefore, the request manager may start buffering the application requests when the battery threshold level reaches 40%. As illustrated, the slope of the portion 404 of the values of the rate of discharge decreases in the time period (e.g., after about 7,000 seconds) after the battery charge reaches 40%, corresponding to the implementation of the present power optimization. Thus, the battery life is extended when the request manager starts buffering the application requests.

Figure 5:
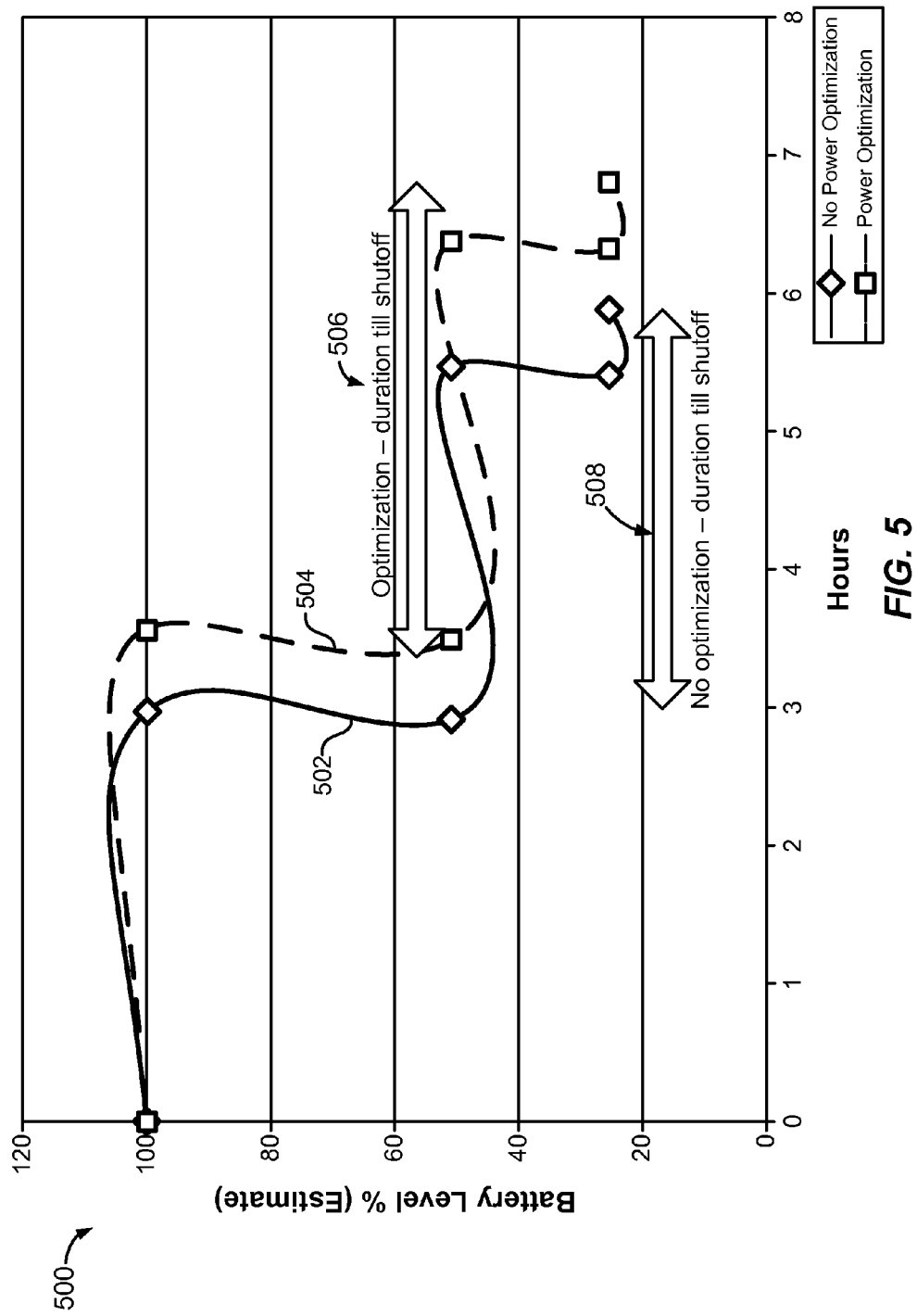
FIG. 5 is an illustration of an example graph comparing the life of a battery between a mobile device using power optimization and a mobile device not using power optimization, in accordance with yet another aspect.

Turning now to FIG. 5, illustrated is an example graph 500, in accordance with yet another aspect, comparing the charge levels of a battery between a mobile device using power optimization and a mobile device not using power optimization. Graph 500 compares the percentage of battery charge level on the y-axis versus the hours of the battery life on the x-axis. In the illustrated example, the mobile device using power optimization, as described above in relation to FIGS. 1-3, has a charge level curve 504 corresponding to longer battery life as compared to the charge level curve 502 of the device without power optimization. For example, in this case, the power optimization extends the battery life up to about 7 hours verses about 6 hours for the non-optimized solution, resulting in about a 7% improvement. As illustrated, the period of time 506 during the optimization process until the mobile device shuts off is longer than the corresponding period of time 508 for a mobile device that is not using power optimization.

Figure 6:
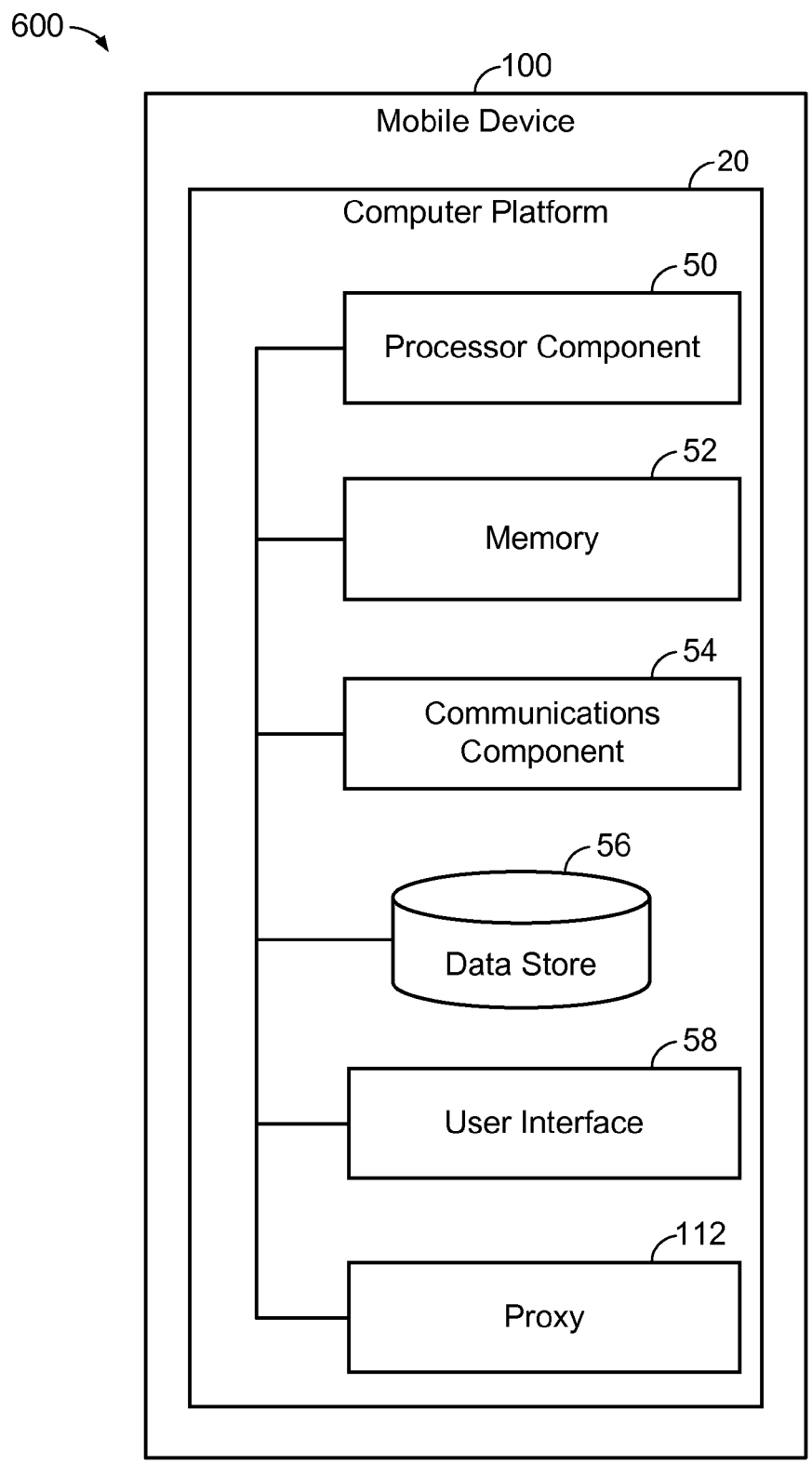
FIG. 6 is an illustration of an example mobile device for employment within a communication system, in accordance with still another aspect.

Referring now to FIG. 6, in one aspect, mobile devices 100 includes a mobile communication device operable on a wireless communication system. As can be appreciated, there are a variety of wireless communication systems, which often employ different spectrum bandwidths and/or different air interface technologies. Exemplary systems include CDMA (CDMA 2000, EV DO, and WCDMA), OFDM, or OFDMA (Flash-OFDM, 802.20, WiMAX), FDMA/TDMA (GSM) systems using FDD or TDD licensed spectrums, peer-to-peer (e.g., mobile-to-mobile) ad hoc network systems often using unpaired unlicensed spectrums, and 802.xx wireless LAN or BLUETOOTH techniques.

Mobile devices 100 includes processor component 50 for carrying out processing functions associated with one or more of components and functions described herein. Processor component 50 can include a single or multiple set of processors or multi-core processors. Moreover, processing component 50 can be implemented as an integrated processing system and/or a distributed processing system.

Mobile devices 100 further include a memory 52, such as for storing local versions of applications being executed by processor component 50. Memory 52 can include random access memory (RAM), read only memory (ROM), and a combination thereof.

Further, mobile devices 100 includes a communications component 54 that provides for establishing and maintaining communications with one or more parties utilizing hardware, software, and services as described herein. Communications component 54 may carry communications between components on mobile devices 100, as well as between mobile devices 100 and external devices, such as devices located across a communications network and/or devices serially or locally connected to mobile devices 100.

Additionally, mobile devices 100 may further include a data store 56, which can be any suitable combination of hardware and/or software, that provides for mass storage of information, databases, and programs employed in connection with aspects described herein. For example, data store 56 may be a data repository for applications not currently executing.

Mobile devices 100 may additionally include a user interface component 58 operable to receive inputs from a user of mobile devices 100, and to generate outputs for presentation to the user. User interface component 58 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 58 may include one or more output devices, including but not limited to a display, a speaker, a haptic feedback mechanism, a printer, any other mechanism capable of presenting an output to a user, or any combination thereof. Moreover, mobile device 100 may include request manager 112 operable for monitoring the various application requests and buffering the application requests prior to routing the requests between components on mobile devices 100, as well as between mobile devices 100 and external devices, such as devices located across a communications network and/or devices serially or locally connected to mobile devices 100.

Figure 7:
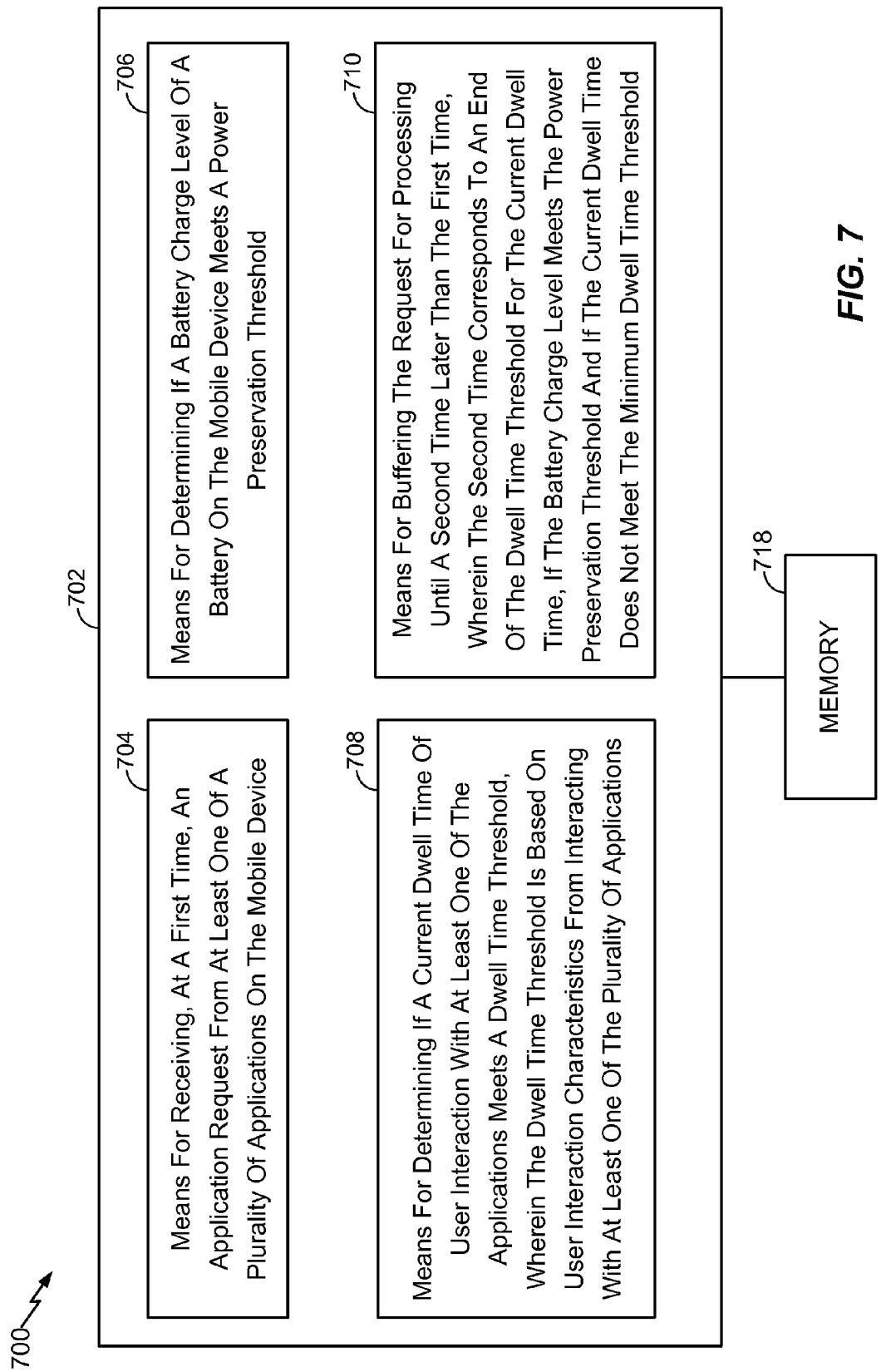
FIG. 7 is an illustration of an example system that facilitates power optimization, in accordance with another aspect.

Referring to FIG. 7, disclosed is one aspect of a system 700 configured for optimizing power of a battery in a mobile device. System 700 can reside within a multiplexer, transmitter, mobile device, user equipment, etc., for instance. As depicted, system 700 includes functional blocks that can represent functions implemented by a processor, software, or combination thereof (e.g., firmware). System 700 includes a logical grouping 702 of electrical components that facilitate optimizing power of a battery in a mobile device. Logical grouping 702 can include means 704 for receiving, at a first time, an application request from at least one of a plurality of applications on the mobile device. In addition, logical grouping 702 can include means 706 for determining if a battery charge level of a battery on the mobile device meets a power preservation threshold. Moreover, logical grouping 702 can include means 708 for determining if a current dwell time of user interaction with at least one of the applications meets a dwell time threshold, wherein the dwell time threshold is based on user interaction characteristics from interacting with at least one of the plurality of applications. Furthermore, logical grouping 702 can include means 710 for buffering the request for processing until a second time later than the first time, wherein the second time corresponds to an end of the dwell time threshold for the current dwell time, if the battery charge level meets the power preservation threshold and if the current dwell time does not meet the minimum dwell time threshold. Additionally, system 700 can include a memory 718 that retains instructions for executing functions associated with electrical components 704, 706, 708, and 710. While shown as being external to memory 718, it is to be understood that electrical components 704, 706, 708 and 710 can exist within memory 718.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

In one or more aspects, some of the functions described (e.g., the dwell determiner and collecting the user interaction data, among others) may be performed at the access network and delivered to the mobile device.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal In the alternative, the processor and the storage medium may reside as discrete components in a user terminal Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs usually reproduce data optically with lasers. Combinations of the above should also be included within the scope of computer-readable media.

While the foregoing disclosure discusses illustrative aspects and/or implementations, it should be noted that various changes and modifications could be made herein without departing from the scope of the described aspects and/or implementations as defined by the appended claims. Furthermore, although elements of the described aspects and/or implementations may be described or claimed in the singular, the plural is contemplated unless limitation to the singular is explicitly stated. Additionally, all or a portion of any aspect and/or implementation may be utilized with all or a portion of any other aspect and/or embodiment, unless stated otherwise.

What is claimed is:

1. A method for optimizing power of a battery in a mobile device, comprising:
   receiving, at a first time, a request from at least one of a plurality of applications on the mobile device;
   determining if a battery charge level of the battery in the mobile device meets a power preservation threshold;
   determining if a current dwell time of user interaction with at least one of the applications meets a dwell time threshold, wherein the dwell time threshold is based on user interaction characteristics from interacting with at least one of the plurality of applications; and
   buffering the request for processing until a second time later than the first time, wherein the second time corresponds to an end of the dwell time threshold for the current dwell time, if the battery charge level meets the power preservation threshold and if the current dwell time does not meet the dwell time threshold.

2. The method of claim 1, further comprising collecting historical data defining the user interaction characteristics, and calculating the dwell time threshold as a function of the collected historical data.

3. The method of claim 2, wherein collecting the user interaction characteristics includes collecting data defining one or more of user interactions with one or more of the plurality of applications on the mobile device, or user interaction with content retrieved from prior requests, or web browsing habits, or type of content viewed.

4. The method of claim 1, wherein receiving the request includes receiving instructions to send data to or receive data from a network via a wireless connection.

5. The method of claim 1, wherein buffering further comprises:
forming a queue including the request.

6. The method of claim 5, wherein forming the queue further comprises listing queued requests in an order based on an application priority.

7. The method of claim 5, wherein forming the queue further comprises listing queued requests in an order based upon an amount of power consumption required by the request.

8. The method of claim 5, wherein forming the queue further comprises listing queued requests in an order based upon a time of receipt.

9. The method of claim 1, wherein buffering further comprises:
delaying processing of the request for a period of time, wherein the period of time is a difference between the dwell time threshold and the current dwell time.

10. The method of claim 1, wherein if the power preservation threshold is achieved, providing a user alert for powering down the mobile device to recover the battery charge level for the mobile device.

11. The method of claim 10, wherein the user alert further comprises:
notifying a user of a first period of time for powering down the mobile device, wherein the first period of time is based on extending the user's interaction with at least one of the applications for a second period of time,
wherein the second period of time is based on user interaction characteristics from interacting with at least one of the plurality of applications.

12. The method of claim 1, wherein if a minimum power preservation threshold is achieved, powering down the mobile device.

13. The method of claim 12, further comprising determining that the battery charge level meets a minimum threshold, and wherein powering down the mobile device is based on the battery charge level meeting the minimum threshold.

14. At least one processor configured for optimizing power of a battery in a mobile device, the at least one processor comprising:
a first module for receiving, at a first time, a request from at least one of a plurality of applications on the mobile device;
a second module for determining if a battery charge level of the battery in the mobile device meets a power preservation threshold;
a third module for determining if a current dwell time of user interaction with at least one of the applications meets a dwell time threshold, wherein the dwell time threshold is based on user interaction characteristics from interacting with at least one of the plurality of applications; and
a fourth module for buffering the request for processing until a second time later than the first time, wherein the second time corresponds to an end of the dwell time threshold for the current dwell time, if the battery charge level meets the power preservation threshold and if the current dwell time does not meet the dwell time threshold.

15. A computer program product, comprising:
a computer-readable medium comprising:
at least one instruction operable to cause a computer to receive, at a first time, a request from at least one of a plurality of applications on the mobile device;
at least one instruction operable to cause the computer to determine if a battery charge level of a battery on the mobile device meets a power preservation threshold;
at least one instruction operable to cause the computer to determine if a current dwell time of user interaction with at least one of the applications meets a dwell time threshold, wherein the dwell time threshold is based on user interaction characteristics from interacting with at least one of the plurality of applications; and
at least one instruction operable to cause the computer to buffer the request for processing until a second time later than the first time, wherein the second time corresponds to an end of the dwell time threshold for the current dwell time, if the battery charge level meets the power preservation threshold and if the current dwell time does not meet the dwell time threshold.

16. A mobile device, comprising:
means for receiving, at a first time, a request from at least one of a plurality of applications on the mobile device;
means for determining if a battery charge level of a battery on the mobile device meets a power preservation threshold;
means for determining if a current dwell time of user interaction with at least one of the applications meets a dwell time threshold, wherein the dwell time threshold is based on user interaction characteristics from interacting with at least one of the plurality of applications; and
means for buffering the request for processing until a second time later than the first time, wherein the second time corresponds to an end of the dwell time threshold for the current dwell time, if the battery charge level meets the power preservation threshold and if the current dwell time does not meet the dwell time threshold.

17. A mobile device, comprising:
a plurality of applications, wherein at least one of the plurality of applications is configured to generate at a first time request for processing;
a battery having a battery charge level;
a memory having a power preservation threshold and a dwell time threshold, wherein the dwell time threshold is based on user interaction characteristics from interacting with at least one of the plurality of applications; and
a request manager having request processing logic, wherein the request processing logic is configured to determine if the battery charge level of the battery meets the power preservation threshold, to determine if a current dwell time of user interaction with at least one of the applications meets the dwell time threshold, and to buffer the request for processing until a second time later than the first time, wherein the second time corresponds to an end of the dwell time threshold for the current dwell time, if the battery charge level meets the power preservation threshold and if the current dwell time does not meet the dwell time threshold.

18. The mobile device of claim 17, further comprising a dwell determiner operable for collecting historical data defining the user interaction characteristics, and further operable for calculating the dwell time threshold as a function of the collected historical data.

19. The mobile device of claim 18, wherein the collected historical data comprises data defining one or more of user interactions with one or more of the plurality of applications on the mobile device, or user interaction with content retrieved from prior requests, or web browsing habits, or type of content viewed.

20. The mobile device of claim 17, wherein the request includes instructions to send data to or receive data from a network via a wireless connection.

21. The mobile device of claim 17, wherein the memory stores the buffered request in a queue.

22. The mobile device of claim 21, wherein the queue further comprises a listing of queued requests in an order based on an application priority.

23. The mobile device of claim 21, wherein the queue further comprises a listing of queued requests in an order based upon an amount of power consumption required by the request.

24. The mobile device of claim 21, wherein the queue further comprises a listing of queued requests in an order based upon a time of receipt.

25. The mobile device of claim 17, wherein the request manager is further operable to delay processing of the request for a period of time, wherein the period of time is a difference between the dwell time threshold and the current dwell time.

26. The mobile device of claim 17, wherein if the power preservation threshold is achieved, the request manager is operable to provide a user alert for powering down the mobile device to recover the battery charge level for the mobile device.

27. The mobile device of claim 26, wherein the user alert further comprises:
   notifying a user of a first period of time for powering down the mobile device, wherein the first period of time is based on extending the user's interaction with at least one of the applications for a second period of time,
   wherein the second period of time is based on user interaction characteristics from interacting with at least one of the plurality of applications.

28. The mobile device of claim 17, wherein the request manager is operable to power down the mobile device if a minimum power preservation threshold is achieved.

29. The mobile device of claim 28, further comprising a charge determiner operable for determining that the battery charge level meets a minimum threshold, and wherein the request manager is operable to power down the mobile device if the battery charge level meets the minimum threshold.

* * * * *